United States Patent [19]
Paquette

[11] 3,797,665
[45] Mar. 19, 1974

[54] SCREEN CHANGER

[75] Inventor: James P. Paquette, Sterling Junction, Mass.

[73] Assignee: The Berlyn Corporation, Millbury, Mass.

[22] Filed: Nov. 20, 1972

[21] Appl. No.: 307,815

[52] U.S. Cl................................ 210/236, 210/447
[51] Int. Cl............................................. B01d 29/00
[58] Field of Search....... 55/97, 270, 328, 422, 481, 55/506; 210/232, 236, 447

[56] References Cited
UNITED STATES PATENTS

| | | | |
|---|---|---|---|
| 565,972 | 8/1896 | Fowler | 210/447 X |
| 2,244,507 | 6/1941 | Thomas | 55/422 X |
| 3,325,980 | 6/1967 | Chameroy et al. | 55/422 |
| 3,615,257 | 10/1971 | Frost et al. | 210/447 X |
| 3,645,401 | 2/1972 | Roberts | 210/232 |
| 3,471,023 | 10/1969 | Rosaen | 210/236 X |

Primary Examiner—Samih N. Zaharna
Assistant Examiner—Richard W. Burks
Attorney, Agent, or Firm—Curtis, Morris & Safford

[57] ABSTRACT

A screen changer wherein sealing pressure is obtained against a breaker plate and filter screen element by providing a screw adjustment from an external adapter which bears against a sealing bearing. The sealing bearing bears against a slide plate carrying the breaker plate to provide a simple and effective externally controllable sealing pressure engagement.

8 Claims, 3 Drawing Figures

SCREEN CHANGER

The present invention relates to screen changers and more particularly the present invention relates to an improved manner of applying sealing pressure to screen changers.

In manufacturing operations such as plastic extrusion, fiber spinning or chemical processing where a mass of heat-softened material is worked, it is essential that contaminants in the materials be removed or filtered out prior to final processing. To such an end, apparatus such as filter screens in the form of square mesh wire cloth or the like are interposed in the path of flow of the material to be filtered. The filtering medium is supported by a backup or breaker plate provided with flow passages therethrough so that material once it has been strained by the filter media flows through the breaker plate and out of the filtering apparatus for further processing.

Because the filtering medium becomes clogged with contaminants after a period of use, it is necessary to change the screen element and, accordingly, most filter screen apparatuses have provision for rapid change of the filter media.

The present invention relates to such an apparatus commonly known as a screen changer. In screen changers it is necessary to provide a sealing pressure against the filter screen and breaker plate so that when the material to be filtered, which is commonly processed through a filter screen changer under high pressure, is passed through the filter screen apparatus no leakage will occur. Sealing pressure must be applied during operative state of the process and is maintained while a hydraulic cylinder moves the slide plate carrying the breaker plate to place a fresh filter medium in the flow path of the material. In time the seals wear necessitating an adjustment.

At present, most filter screen changing apparatus use a complex threaded sleeve arrangement which is externally adjusted much like a threaded nut to apply sealing pressure against the breaker plate. Such threaded sleeves become inordinately large for large filter screen apparatus, must be very carefully machined and are therefore exceedingly expensive to manufacture and require complex internal seal arrangements to compensate for the movement of the sleeve.

Other designs utilize split bodies that are bolted together. These are difficult to align properly, and more expensive to machine, take up more space and sacrifice strength.

It is an object of the present invention to provide a filter screen changing apparatus with an efficient and effective means for providing sealing pressure against the breaker plate.

A further object of the present invention is to provide a screen changer of the character described wherein sealing pressure against the breaker plate is accomplished with a simple sleeve bearing and threaded bolt adjustment of an external adapter against the sleeve bearing.

It is also an object of the present invention to provide an improved breaker plate construction in a screen changing apparatus to improve the flow characteristics of the material being filtered.

These and other objects and advantagess of the present invention will be more readily apparent after consideration of the following specification taken in conjunction with the accompanying drawing, in which.

Figure 1:
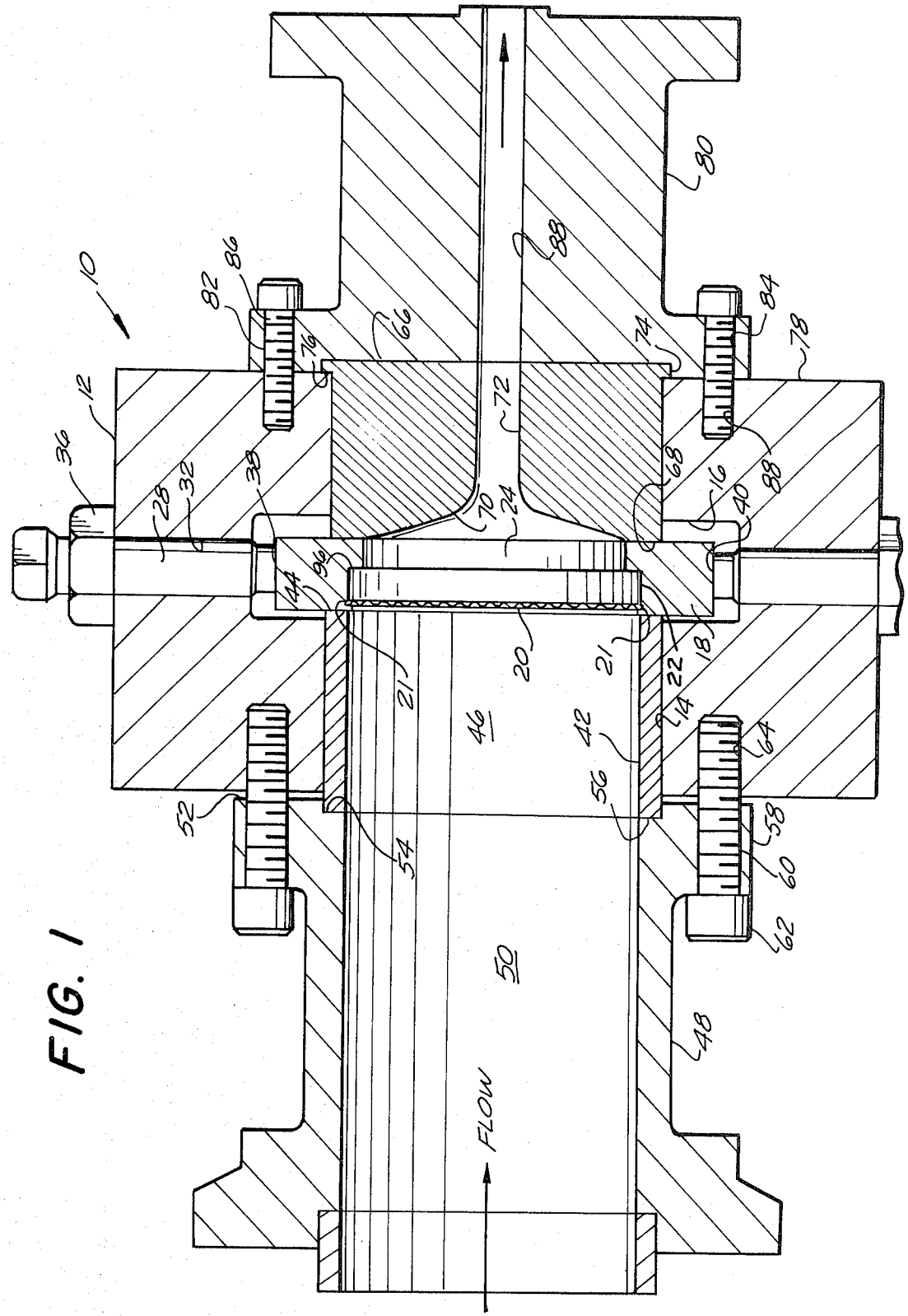
FIG. 1 is a sectional view of the screen changer apparatus of the present invention.

With reference to the drawing and particularly FIG. 1, a slide plate screen changer apparatus 10 is shown and includes a housing 12, which is preferably a one-piece cast steel housing, provided with a cylindrical bore 14 disposed axially through the housing. A slide plate opening 16 is also provided which may be rectangular in cross-section and which is formed laterally through the housing 12 perpendicular to the axis of cylindrical bore 14.

A slide plate member 18 is provided within slide opening 16 and is adapted to be moved laterally within housing 12 whenever a screen changing procedure is initiated. Slide plate 18 serves as a carrier for the filtering medium 20 which is preferably a mesh screening material having a circular configuration and carried within a circular opening 22 in slide plate 18.

The flow of the material to be filtered is from left to right, as viewed in FIG. 1, and since the material is processed through housing 12 under high pressure, immediately behind the filtering medium 20 a backup or breaker plate 24 is provided disposed within the slide plate 18. Thus, when the plastic material to be filtered is caused to flow through housing 12, the material is forced through the screening material 20 which is mounted within a circular groove 21 in slide plate 18 and supported by the backup or breaker plate 24 and through the breaker plate 24 through a plurality of flow passages 26 (see FIGS. 2 and 3) therethrough. The slide plate 18 is disposed within housing 12 during filtering operation by bolt members 28 and 30 disposed within bolt receiving apertures 32 and 34, respectively, in housing 12 with each of the bolts being threadably engaged within a nut member 36 secured to housing 12 so that the ends 38 and 40, respectively, of bolts 28 and 30 bear against slide plate 18 to firmly position the slide plate within the housing 12.

While material such as a heat-softened plastic material is processed through the filtering apparatus, the material is forced to flow through the apparatus under high pressures. Consequently, provision must be made to seal the material within the housing to preclude leakage. Accordingly, a seal in the form of a cylindrical sleeve bearing member 42, which preferably is of an alloy such as Bernalloy is provided within cylindrical bore 14 on the upstream side of material flow. One end 44 of the sleeve fits in abutting relationship against that segment of the slide plate 18 which overlies the screen 20 to confine the material to be filtered within the cylindrical cavity 46 of sleeve 42. As long as the sleeve 42 is maintained in abutting relationship against slide plate 18 with sufficient force, an effective and tight seal is maintained so that the material being filtered does not leak out of the housing 12 through the slide opening 16.

To maintain the sleeve 42 in a pressure sealing relationship against the slide plate 18 a flanged adapter member 48 is provided. The adapter 48 includes a cylindrical cavity 50 therethrough in register with bore 14 through which the material to be filtered is caused to flow under pressure. One end 52 of adapter 48 is provided with a cylindrical indentation 54 to accommodate the free end 56 of sleeve 42. The adapter 48 includes a flanged segment 58 provided with a plurality of circumferentially spaced bolt access bores 60 therethrough. A plurality of threaded bolt members 62 are provided through the bolt access bores 60 in flange 58 and into a plurality of threaded receiving bores 64 in housing 12. Thus, the adapter member 48 maintains the sleeve 42 in tight abutting sealing relationship against slide plate 18 when the bolts 62 are threadably engaged through the flange 58 and into the housing 12.

The downstream side, i.e. after the material has flowed through the filter 20 and breaker plate 24, is also sealed to preclude leakage of a fluid out of housing 12. On the downstream side a sleeve 66, which is also preferably of an alloy such as Bernalloy, is provided. Sleeve 66 includes a forward face 68 adapted to abut the breaker plate 24 in sealing relationship provided with a conically shaped cavity 70 therein terminating in a cylindrical through passage 72. The shape of the cavity 70 is designed to channel the flow of material after it has passed through the breaker plate toward the centrally disposed flow passage 72. Sleeve 66 also includes an extending flange segment 74 at its other end which provides a shoulder 76 to sit in abutting relationship on the rear face 78 of the housing 12.

A downstream adapter segment 80 is also provided which includes a flanged segment 82 having a plurality of circumferentially spaced threaded bolt receiving bores 84 therethrough. A plurality of threaded bolt members 86 are engaged through the bores 84 and into threaded receiving bores 88 in the housing 12 and the adapter 80 is maintained in sealing abutting relationship with sleeve 66 by tightening the bolts 84.

The adapter 84 also includes a cylindrical flow passage 88 therethrough which is in register with the flow passage 72 in sleeve 66 so that material which has been filtered by filter 20 flows under pressure through the breaker plate 24 and into the flow passages 72 and 88 until it passes out of the filter apparatus to a die or other processing step.

Figure 3:
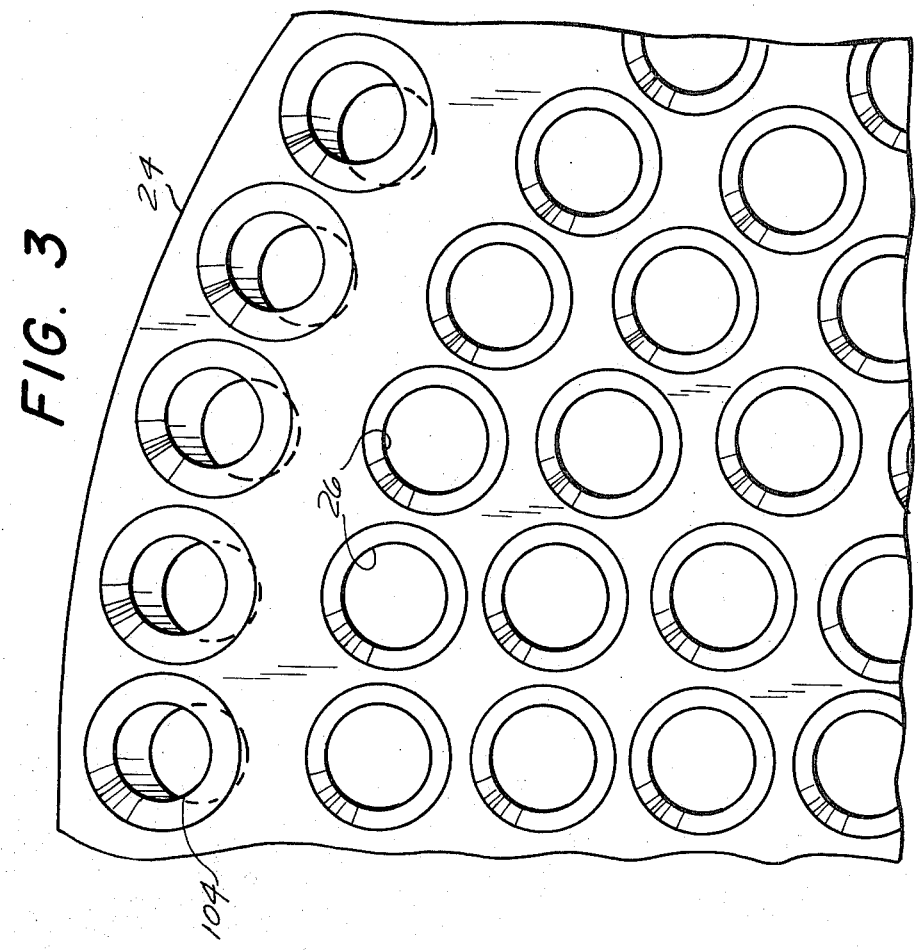
FIG. 3 is a plan view of the breaker plate of the present invention.
Figure 2:
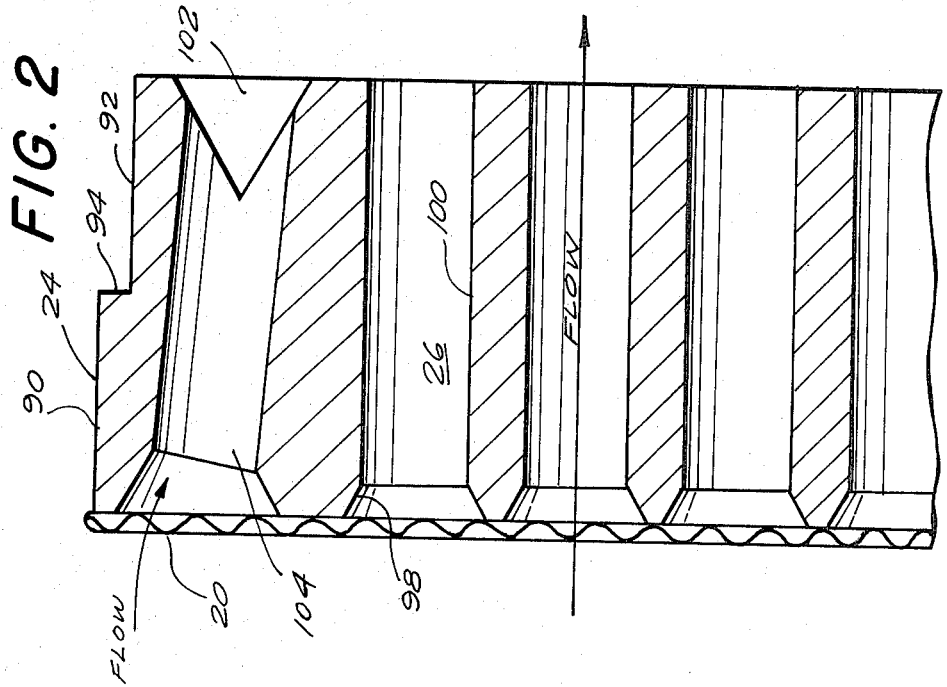
FIG. 2 is an enlarged sectional view of a segment of the removable-type breaker plate of the screen changing apparatus of the present invention.

Reference is now made to FIGS. 2 and 3 where the breaker plate 24 of the present invention is illustrated. The breaker plate 24 includes an upstream segment 90 which has a larger cross-sectional diameter than the downstream segment 92 to form a shoulder 94 which sits in abutting relationship against a shoulder 96 (see FIG. 1) formed in the slide plate 18. Since the pressure causing the material to flow through the screen 20 and breaker plate 24 is imparted from the upstream side, the breaker plate assembly maintains its orientation within the slide plate during operation because of the engagement of the shoulder 94.

Throughout the central portion of the breaker plate 24 the flow passages 26 are formed as straight cylindrical openings through the breaker plate. The straight through openings include a counterbored segment 98 at the upstream end which leads into the cylindrical segment 100. The flared ends 98 minimize dead spots to preclude collection of the heat-softened material on the upstream side of the breaker plate and offer a minimum resistance to the flow of the material through the passages 26.

Because the flow of the material is drastically restricted immediately after it emerges from the breaker plate on the downstream side, as the material flows through the conical depression 70 in the downstream sleeve 66, a high resistance to the flow of the material from the radially outermost flow passages 26 is encountered. To alleviate the high resistance to the flow of the material and to preclude undesired collection of the material in the radially outermost area, the radially outermost row of apertures are oriented to direct the flow of material more inwardly.

Accordingly, around the perimeter of the breaker plate 24 the outermost row of flow passages 104 is disposed at an angle with respect to the longitudinal axis of the breaker plate. Each of these flow through passages 104 are angled inwardly from the upstream side to the downstream side so that the flow of material is directed radially inwardly as well. Since these apertures are longer, increased flow resistance results. Accordingly, a V-groove 102 is provided on the downstream side of flow passages 104 to shorten the flow path for material passing through these passages. The flow passages 104 feed material into the cavity 70 at its outermost periphery and because of the angle of inclination of the outermost passages the flow of material is directed more inwardly to closely assume the contour of the cavity 70 in the sleeve 66 and thus a minimum of flow restriction results.

While the specific embodiment disclosed herein illustrates a breaker plate carried within a slide plate, it is also to be understood that the present invention may also be utilized where the breaker plate configuration is formed directly in a slide plate as an integral unit. In this case the flow passages 100 and 104 would be drilled through the slide plate itself and the sealing sleeve would bear against the slide plate radially outwardly of the breaker plate configuration.

It is thus seen that the present invention provides an improved construction for slide plate screen changers which provides a simple and effective manner of sealing the slide plate passage to preclude undesired leakage of material. The invention also provides an improved breaker plate construction which minimizes flow resistance of material flowing through the breaker plate flow passages.

I claim:

1. An apparatus to filter contaminants from a heat-softened material comprising,
   a housing,
   said housing including a first passage therethrough through which said heat-softened material is forced to flow,
   said housing including a second passage therethrough intersecting said first passage,
   a slide plate disposed within said second passage,
   said slide plate including an opening therein disposed in register with said first passage in said housing,
   filter means disposed within said opening in said slide plate to filter said heat-softened material flowing through said first passage,
   a sleeve member having an axial passage therethrough disposed within said first passage on the upstream side of said slide plate,
   said sleeve member having one end thereof disposed in sealing relationship with said opening in said slide plate and having its other end extending beyond the surface of said housing, and means disposed exterior said housing adapted to contact said sleeve member other end and impart sealing force thereto to insure sealing bearing of said sleeve member one end with said slide plate.

2. Apparatus as defined in claim 1 wherein said means disposed exterior said housing comprises an adapter member provided with a passage therethrough in register with said axial passage of said sleeve member and including a radially outwardly extending flange segment thereabout, means engageable between said flange segment and said housing to apply inward sealing force against said sleeve member.

3. Apparatus as defined in claim 2 wherein said flange segment includes a plurality of circumferentially spaced bolt receiving apertures therethrough, said housing including a plurality of threaded bolt receiving bores in register with said bolt receiving apertures in said flange segment and said means engageable between said flange segment and said housing comprise a plurality of bolt members disposed through said bolt receiving apertures and threadably engaged within said bolt receiving bores whereby sealing force is obtained by threaded engagement of said bolts within said bores to exert bearing pressure against said sleeve member.

4. Apparatus as defined in claim 3 wherein said sleeve member other end extends beyond the surface of said housing and said adapter member includes an indentation formed in the end disposed adjacent said housing, said indentation being dimensioned to receive the extending portion of said sleeve member other end therein whereby said adapter member engages and bears against said sleeve member to provide said sealing force.

5. Apparatus as defined in claim 1 wherein a second sleeve member is provided within said first passage on the downstream side of said slide plate, said second sleeve member having one end thereof disposed in sealing relationship with said opening in said slide plate and having its other end extending beyond the surface of said housing, and means disposed exterior said housing adapted to contact said second sleeve member other end and import sealing force thereto to insure sealing bearing of said second sleeve member one end with said slide plate.

6. Apparatus as defined in claim 5 wherein said second sleeve member includes flow passage means therethrough and said means disposed exterior said housing comprises an adapter member provided with a passage therethrough in register with said flow passage means of said second sleeve member and a radially outwardly extending flange segment thereabout, means engageable between said flange segment and said housing to apply inward sealing force against said sleeve member to insure sealing bearing of said second sleeve member one end with said slide plate.

7. Apparatus as defined in claim 5 wherein said filter means comprises a filter medium of mesh-like material supported on its downstream side by a breaker plate comprising a plate member provided with a plurality of flow passages therethrough and said passage means in said second sleeve member comprises a cavity formed in said one end of said second sleeve member having a conical shape terminating in an axially disposed flow passage to said second sleeve member other end whereby material flows through said filter medium and breaker plate into said cavity and out said flow passage.

8. Apparatus as defined in claim 7 wherein the radially innermost ones of said plurality of flow passages provided in said breaker plate are oriented with their axes parallel to the flow path of material through said housing and the radially outermost ones of said plurality of flow passages provided in said breaker plate are oriented with their axes directed inwardly in the direction of material flow to channel the flow of material to more nearly conform to the configuration of said cavity in said second sleeve member thereby to minimize flow resistance.

* * * * *